(12) United States Patent
Dufresne

(10) Patent No.: US 10,448,587 B2
(45) Date of Patent: Oct. 22, 2019

(54) MULTILEVEL AEROPONIC TERRACE GROWING SYSTEM FOR GROWING INDOOR VEGETATION

(71) Applicant: Stephen A. Dufresne, Calgary (CA)

(72) Inventor: Stephen A. Dufresne, Calgary (CA)

( * ) Notice: Subject to any disclaimer, the term of this patent is extended or adjusted under 35 U.S.C. 154(b) by 219 days.

(21) Appl. No.: 15/001,648

(22) Filed: Jan. 20, 2016

(65) Prior Publication Data

US 2017/0202164 A1 Jul. 20, 2017

(51) Int. Cl.
*A01G 31/06* (2006.01)
*A01G 31/02* (2006.01)

(52) U.S. Cl.
CPC ............. *A01G 31/06* (2013.01); *A01G 31/02* (2013.01); *Y02P 60/216* (2015.11)

(58) Field of Classification Search
CPC ........ A01G 7/045; A01G 9/025; A01G 29/00; A01G 31/02; A01G 31/06; Y02P 60/216
USPC .................................... 47/59 R, 62 A, 82, 83
See application file for complete search history.

(56) References Cited

U.S. PATENT DOCUMENTS

| | | | | |
|---|---|---|---|---|
| 1,217,239 A * | 2/1917 | Swartz | ................. | A01G 9/1423 261/DIG. 11 |
| 4,059,922 A * | 11/1977 | DiGiacinto | ............ | A01G 31/06 47/59 R |
| 4,075,785 A * | 2/1978 | Jones | ..................... | A01G 31/06 47/64 |
| 4,218,847 A * | 8/1980 | Leroux | .................. | A01G 31/06 47/59 R |
| 4,255,896 A * | 3/1981 | Carl | ....................... | A01G 31/06 47/62 C |
| 4,704,818 A * | 11/1987 | Cameron | ............... | A01G 9/022 47/48.5 |
| 4,798,133 A * | 1/1989 | Johnson | ................. | A47G 19/28 206/521.15 |
| 4,869,019 A * | 9/1989 | Ehrlich | .................. | A01G 31/06 47/59 R |
| 4,953,363 A * | 9/1990 | Primozic | ............... | A47F 3/0443 312/116 |
| 4,965,962 A * | 10/1990 | Akagi | .................... | A01G 31/06 47/62 A |
| 6,000,173 A * | 12/1999 | Schow | .................. | A01G 31/02 47/59 R |

(Continued)

*Primary Examiner* — Joshua D Huson
*Assistant Examiner* — Brady W Frazier
(74) *Attorney, Agent, or Firm* — Dunlap Bennett & Ludwig PLLC

(57) ABSTRACT

A multilevel aeroponic terrace growing system for growing vegetation within a warehouse is provided. The multilevel aeroponic terrace growing system includes a plurality of terrace structures. Each of the terrace structures include a bottom portion and at least one growing panel. The growing panel extends from the bottom portion at an angle. The growing panel includes an inner surface and an outer surface. The outer surface includes a plurality of adjoining risers and terrace levels forming a step like structure. A plurality of plant plug openings are formed through each of the terrace levels. A substantially enclosed space is formed in between the bottom portion and the growing panel, thereby enclosing the roots. A lighting system may be positioned to emit light towards the outer surface and on the plants. A mister system may be disposed within the substantially enclosed space and emits a mist to irrigate the roots.

15 Claims, 10 Drawing Sheets

(56) References Cited

U.S. PATENT DOCUMENTS

| | | | | |
|---|---|---|---|---|
| 6,276,531 B1* | 8/2001 | Andrews | B65D 85/32 | 206/511 |
| 7,080,482 B1* | 7/2006 | Bradley | A01G 31/02 | 47/60 |
| 8,181,391 B1* | 5/2012 | Giacomantonio | A01G 9/025 | 47/59 R |
| 2003/0223850 A1* | 12/2003 | Hendriks | A01G 9/143 | 414/626 |
| 2006/0156624 A1* | 7/2006 | Roy | A01G 31/02 | 47/62 R |
| 2009/0307973 A1* | 12/2009 | Adams | A01G 31/06 | 47/62 C |
| 2011/0061296 A1* | 3/2011 | Simmons | A01G 31/02 | 47/62 A |
| 2012/0060416 A1* | 3/2012 | Brusatore | A01G 31/06 | 47/62 A |
| 2012/0227320 A1* | 9/2012 | Dos Santos | A01G 9/025 | 47/79 |
| 2012/0297678 A1* | 11/2012 | Luebbers | A01G 31/02 | 47/62 A |
| 2013/0152468 A1* | 6/2013 | Huang | A01G 9/022 | 47/82 |
| 2014/0000162 A1* | 1/2014 | Blank | A01G 31/06 | 47/62 A |
| 2014/0130413 A1* | 5/2014 | Storey | A01G 31/06 | 47/62 A |
| 2014/0190078 A1* | 7/2014 | Kim | A01G 31/02 | 47/62 A |
| 2014/0325907 A1* | 11/2014 | Meyer | A01G 9/023 | 47/82 |
| 2015/0040478 A1* | 2/2015 | Moghaddam | A01G 31/042 | 47/62 R |
| 2015/0313104 A1* | 11/2015 | Cottrell | A01G 1/001 | 47/62 A |
| 2015/0319947 A1* | 11/2015 | Smith | A01G 31/02 | 47/62 A |
| 2015/0334930 A1* | 11/2015 | Stoltzfus | A01G 31/06 | 47/62 A |
| 2015/0351325 A1* | 12/2015 | Shelor | A01G 7/045 | 47/58.1 LS |
| 2016/0014977 A1* | 1/2016 | Esaki | A01G 31/06 | 47/66.6 |

* cited by examiner

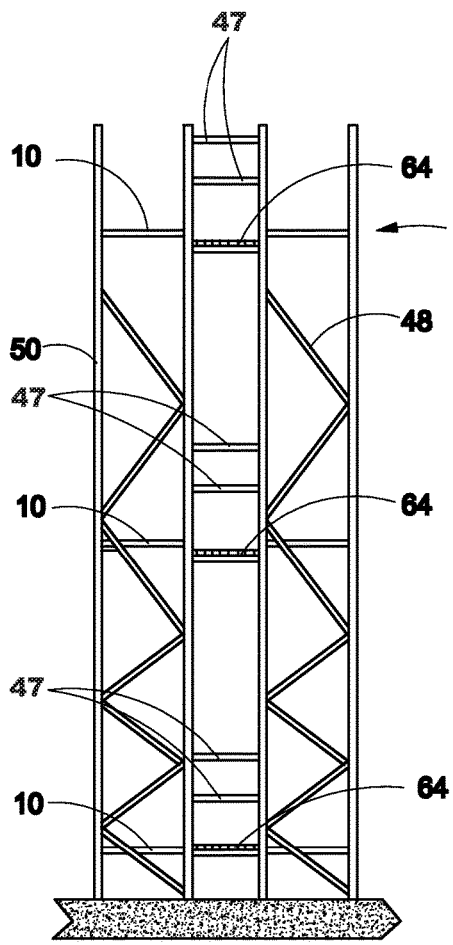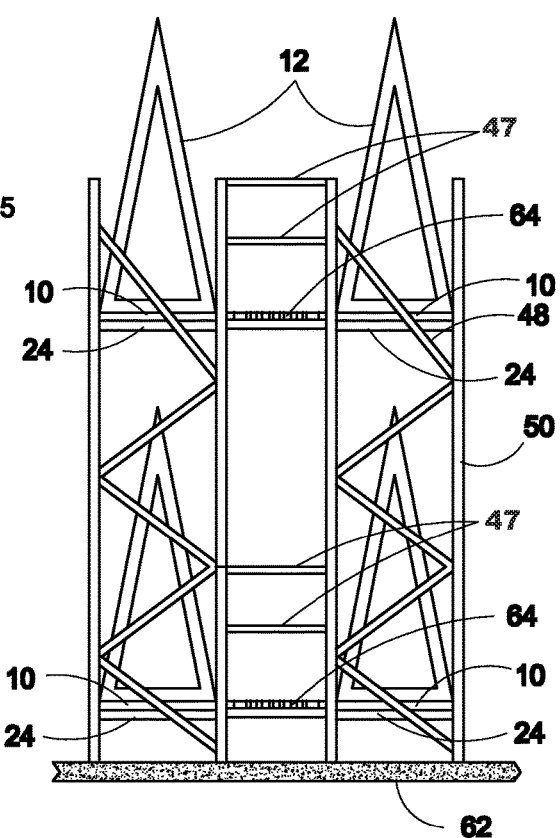
Fig. 2A
Fig. 2B

MULTILEVEL AEROPONIC TERRACE GROWING SYSTEM FOR GROWING INDOOR VEGETATION

BACKGROUND OF THE INVENTION

The present invention relates to indoor growing systems and, more particularly, to a multilevel aeroponic terrace growing system for growing high density vegetation in a controlled indoor environment.

A grow room is a room of any size where plants are grown under controlled environmental conditions. Plants are grown with the use of artificial light. The plants in a grow room can be grown in soil, or without soil via means of aeroponic technology. Not only is growing aeroponically more cost effective, one also gets a higher yield due to an accelerated growing cycle of faster fruit maturation. Utilizing a warehouse as a grow room either next to or in dense population areas is very desirable in order to provide fresh quality vegetation with higher levels of nutrition while substantially reducing your carbon foot print.

As can be seen, there is a need for improved and efficient systems for growing vegetation within indoor grow rooms.

SUMMARY OF THE INVENTION

In one aspect of the present invention, an aeroponic system for growing vegetation comprises: at least one terrace structure comprising: a bottom portion configured to support the terrace structure in an upright position; and at least one growing panel extending from the bottom portion at an angle relative to the bottom portion and comprising an outer surface and an inner surface, wherein the outer surface comprises a plurality of adjoining risers and terrace levels, wherein, a plurality of openings are formed through the terrace levels, and a substantially enclosed space is formed within the terrace structure in between the bottom portion and the at least one growing panel; a lighting system comprising a plurality of lights positioned to emit light towards the outer surface of the at least one growing panel; and a mister system disposed within the substantially enclosed space.

These and other features, aspects and advantages of the present invention will become better understood with reference to the following drawings, description and claims.

BRIEF DESCRIPTION OF THE DRAWINGS

FIG. 2A is an end view of embodiments of multilevel racking structures of the present invention;

FIG. 2B is an end view of a multilevel racking structure supporting terrace structures of the present invention;

DETAILED DESCRIPTION OF THE INVENTION

Figure 1:
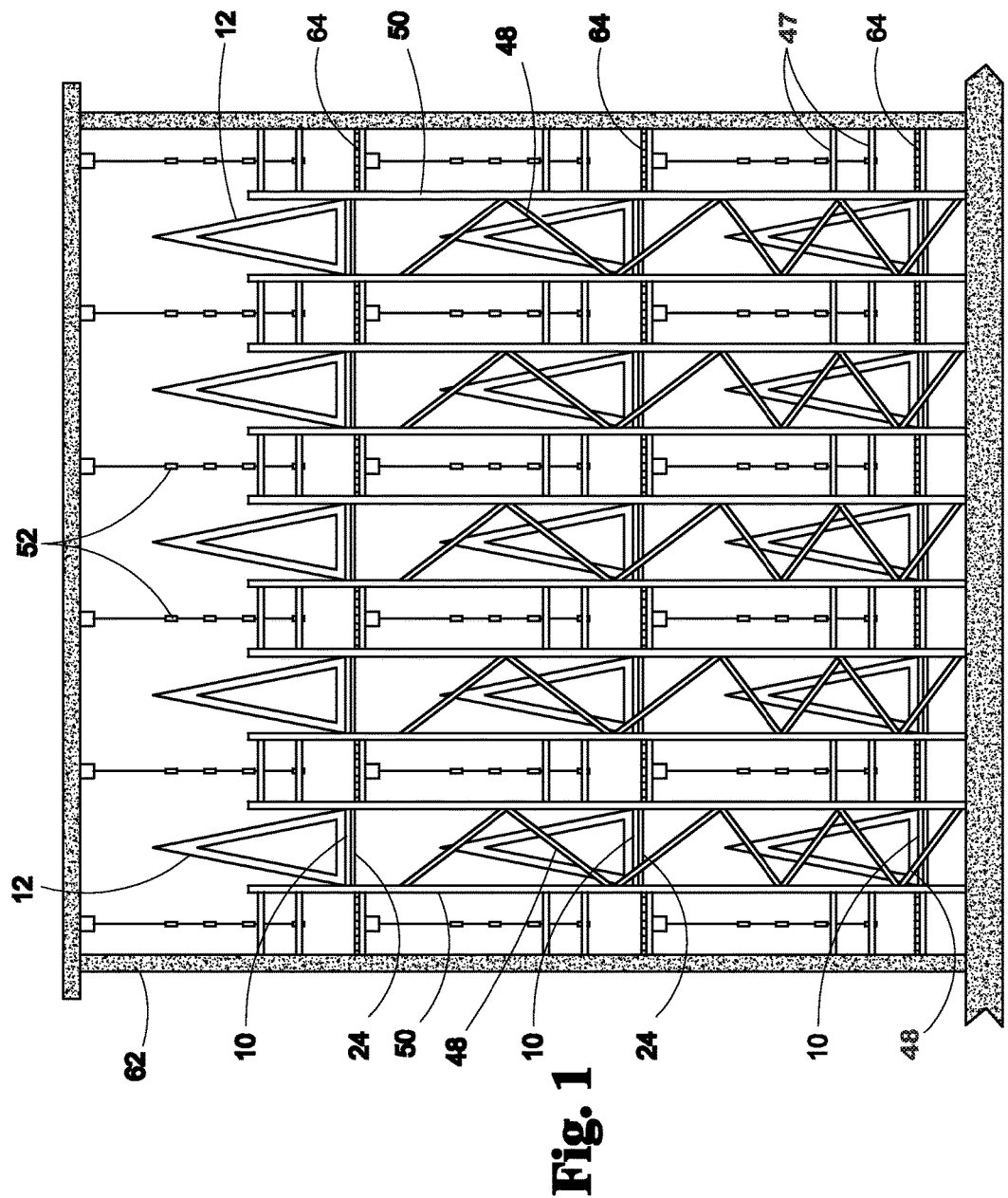
FIG. 1 is a cutaway end view of warehouse including an embodiment of the present invention.
Figure 3:
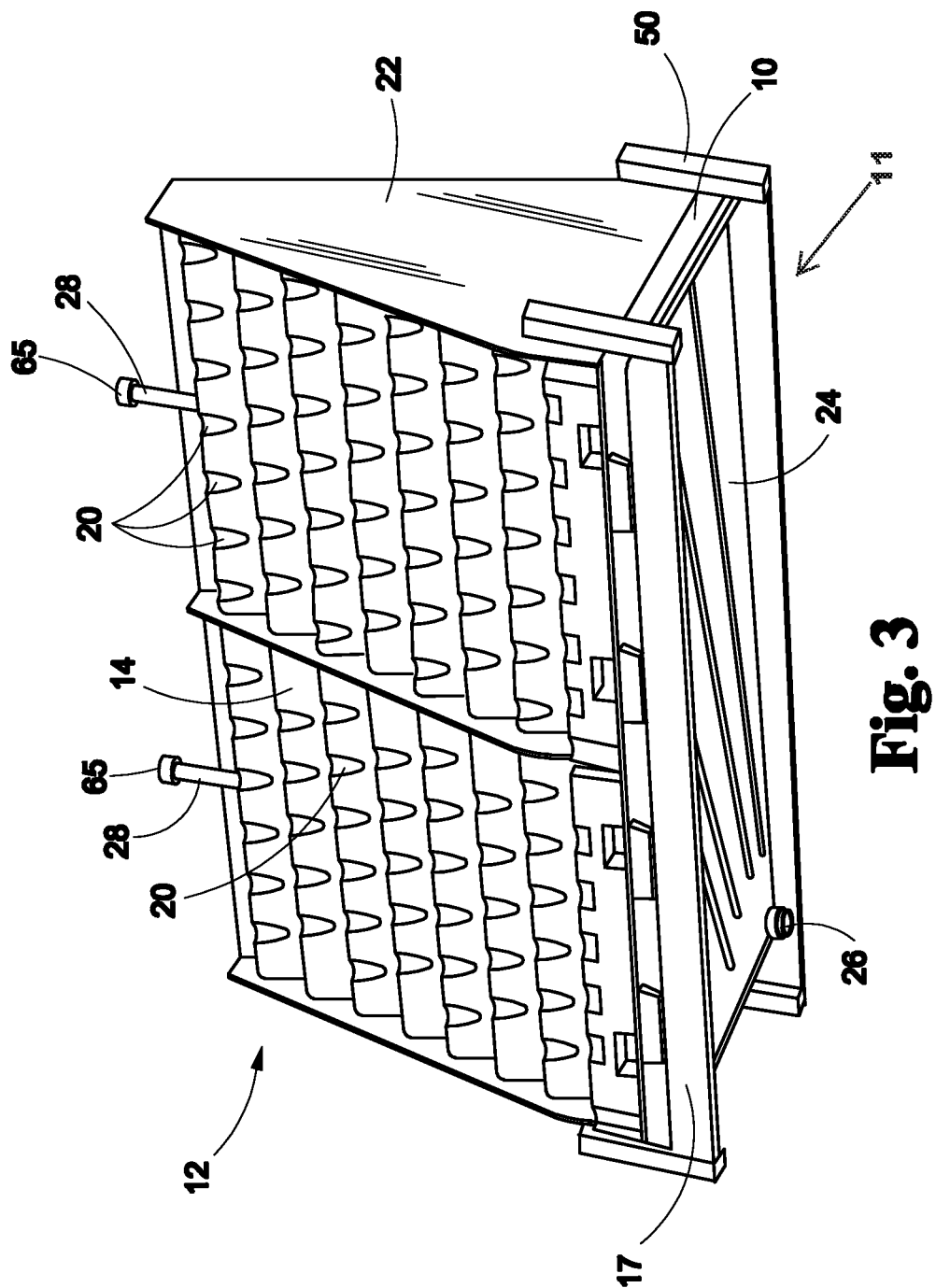
FIG. 3 is a bottom perspective view of a terrace structure of an embodiment of the present invention.
Figure 4:
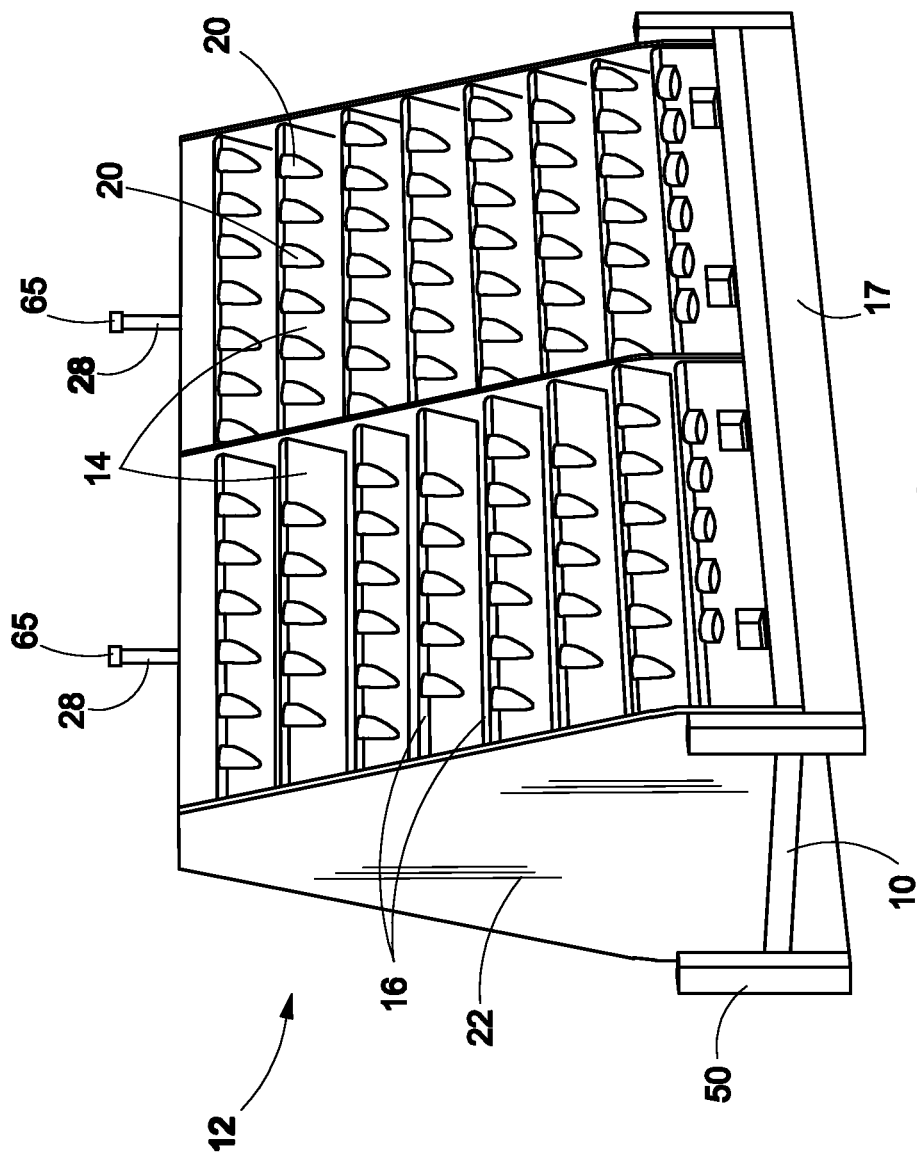
FIG. 4 is a front perspective view of a terrace structure of an embodiment of the present invention.
Figure 5:
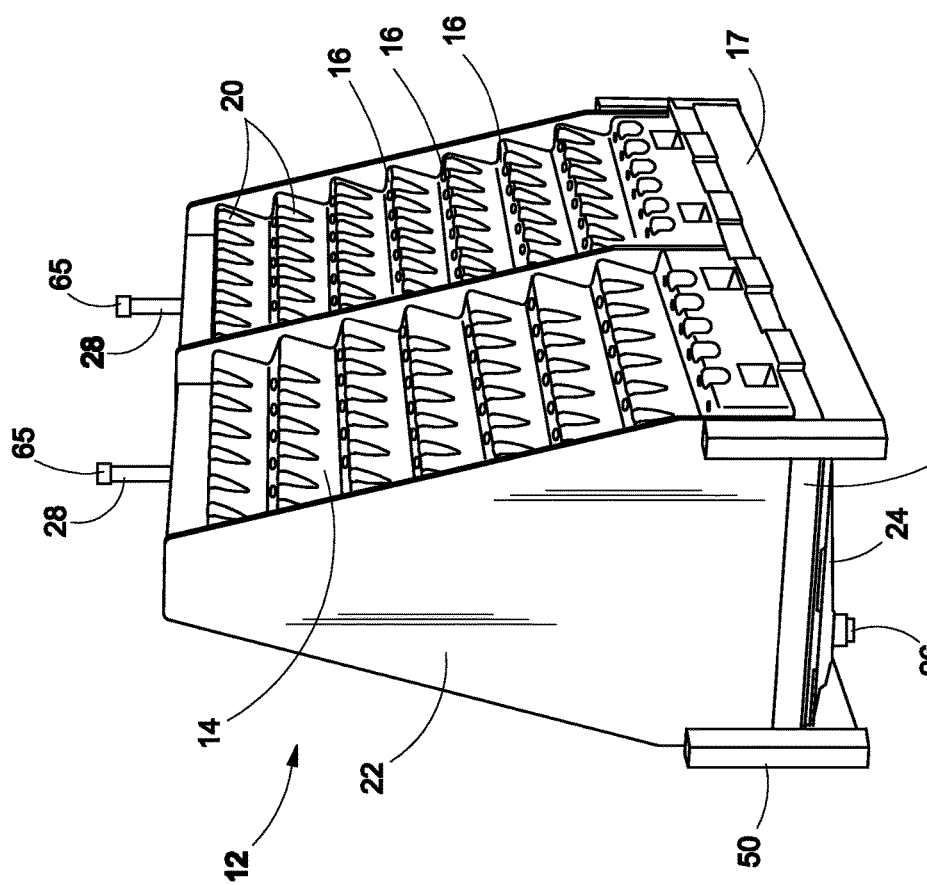
FIG. 5 is a side perspective view of a terrace structure of an embodiment of the present invention.
Figure 6:
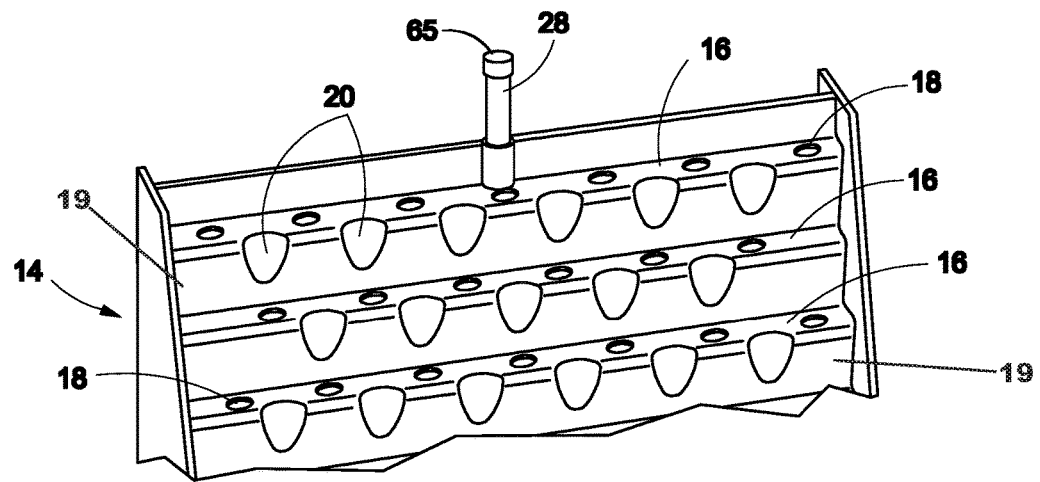
FIG. 6 is a section view of a growing panel of an embodiment of the present invention.
Figure 7:
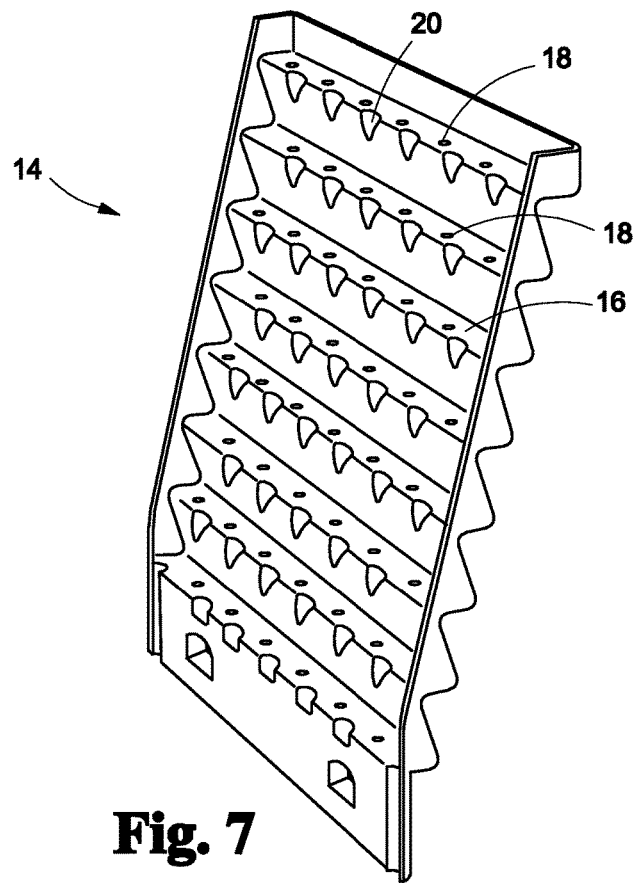
FIG. 7 is a front perspective view of a growing panel of an embodiment of the present invention.
Figure 8:
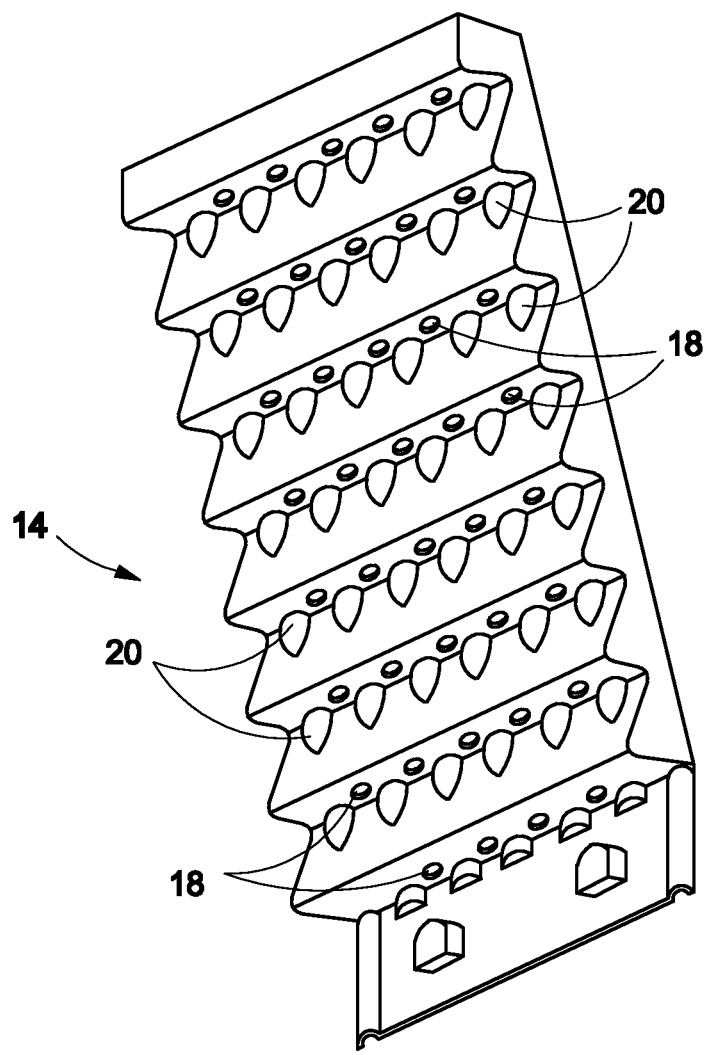
FIG. 8 is a rear perspective view of a growing panel of an embodiment of the present invention.
Figure 9:
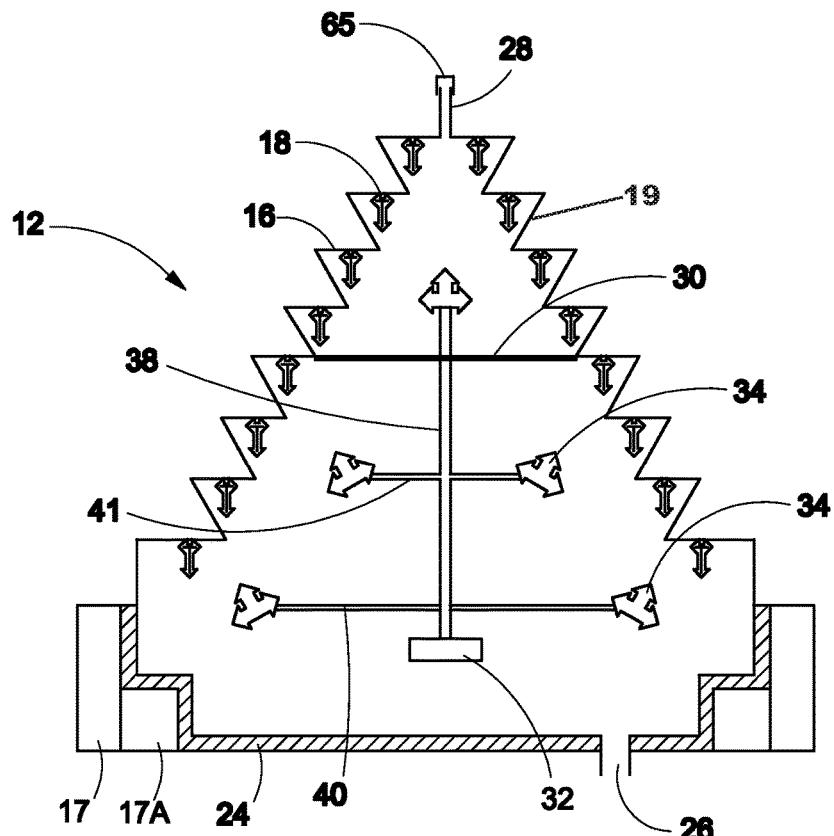
FIG. 9 is a cutaway view of growing panels illustrating a mister system and a catch pan.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a multilevel aeroponic terrace growing system having an aeroponic misting system, triangle shaped terrace structures, and a multilevel racking structure for the production of high density fresh vegetation grown in a controlled indoor environment. The multilevel aeroponic terrace growing system suspends plants in midair allowing misters to aeroponically irrigate the roots in a confined growth chamber suspended on a terrace structure. Further the present invention facilitates the planting, harvesting and servicing of vegetation without the need for ladders, stairs or mechanical lifts.

The present invention is extremely useful in that it utilizes a standard warehouse located anywhere but preferably in or next to the local urban population it is servicing i.e. in the cities. The present invention converts warehouses into a large environmentally controlled growth chamber that can house multiple multilevel racking structures with multiple terrace structures. The terrace structures of the present invention each have a plurality of growing panels that are capable of producing large volumes of vegetation in a small space and facilitating the local delivery of fresh vine ripped nutritious vegetation with a very small carbon foot print.

In addition to the above mentioned benefits, the present invention provides for maximum Leaf Area Index (LAI) while providing for maximum number of plants per square foot. The present invention creates a closed cavern allowing the plant to flourish on the outside environment with light and enriched $CO_2$ air required for the photosynthesis process. The present invention creates perfect dark environment for the roots to hang freely and absorb fresh air and nutrient fertilizer while being protected from light and the enriched $CO_2$ air which can be harmful to the roots. The pitch of the growing panels have been specifically calculated to occupy the minimum amount of floor square footage while still allowing each terrace levels of plant's roots to hang vertically without touching or overlapping the next terrace level of plant's roots so that all plant's roots can be misted equally.

Referring to FIGS. 1 through 14, the present invention includes multilevel aeroponic terrace growing system. The multilevel aeroponic terrace growing system includes a plurality of terrace structures 12, a mister system 35, and a lighting system 52. Each of the terrace structures 12 are supported vertically relative to one another on a multilevel racking structure 15. The multilevel aeroponic terrace growing system facilitates the production of vegetation within a warehouse 62.

Each of the terrace structures 12 include a bottom portion 11 and at least one growing panel 14. The bottom portion 11 is configured to support the terrace structure 12 in an upright position. The growing panel 14 extends from the bottom portion 11 at an angle. The angle between the growing panel 14 and the bottom portion may be from about 45 degrees up to about 75 degrees, such as about 60 degrees. The growing panel 14 includes an inner surface and an outer surface. The outer surface includes a plurality of adjoining risers 19 and terrace levels 16 forming a step like structure. A plurality of openings 18 are formed through each of the terrace levels 16. A plant may fit within an opening 18 such that the foliage is protruding from the outer surface and the roots are protruding from the inner surface. A substantially enclosed space is formed in between the bottom portion 11 and the growing panel 14, thereby enclosing the roots. The lighting system 52 may be positioned to emit light towards the outer surface and on the plants. The mister system 35 may be disposed within the substantially enclosed space and emit a mist of water droplets that are propelled through fresh air absorbing oxygen and landing on the roots.

The terrace structures 12 of the present invention may be made of a polymer such as, but not limited to, thermoform, prime Acrylonitrile-Butadiene-Styrene (ABS), high molecular weight polyethylene, Amorphous thermoplastic material, and the like in a variety of colors. The terrace structures 12 of the present invention may further include stabilizing bars 30. The stabilizing bars 30 strengthen the growing panels 14, thereby preventing the growing panels 14 from collapsing inward on each other due to the weight of the plants.

In certain embodiments, the terrace structures 12 of the present invention may include more than one growing panel 14. For example, the present invention may include two growing panels 14 joined in sequence and a second pair of growing panels 14 also joined in sequence supported from opposing sides of the bottom portion 11 and angled towards one another, such as from about 45 degrees up to 80 degrees, such as about 60 degrees relative to the bottom portion 11, forming a triangle-shaped structure. The shape of the present invention protects the plant foliage from being drenched while allowing the plant's roots to be irrigated aeroponically. The terrace levels 16 allow each plant the maximum LAI for the greatest exposure to light. The enclosure keeps out the enriched $CO_2$ air from exposure to the roots and shields the roots from the light.

In certain embodiments, each of the terrace structures 12 may include four growing panels 14. Each of the growing panels 14 may include a plurality of terrace levels 16. For example, each panel 14 may include about four up to about nine or more terrace levels 16. Each of the terrace levels 16 may be substantially parallel with one another and parallel to the ground in which the terrace structure 12 is resting. As mentioned above, each of the growing panels 14 of the present invention includes a plurality of openings 18. In certain embodiments, each growing panel 14 may include about twenty-four and up to about one hundred and sixteen or more openings 18. The openings 18 may be evenly spaced apart from one another on each terrace level 16. The spacing of the openings 18 results in creating the maximum LAI for the greatest exposure to light. The size of the plant openings 18 may vary and depend on the size of the plant's plug. For example, the openings 18 may include a diameter of about a half of an inch to two inches.

In certain embodiments, each of the growing panels 14 may include a plurality of indents 20 forming convex protrusions on the inner surface. The indents 20 may be formed in between each of the plug holes 18 and may be formed where the plurality of risers 19 and the plurality of terraces 16 meet. The convex protrusions formed by the indents 20 are rounded and form reflective walls on both sides of the plant's roots, and thereby help deflect water onto the roots from all sides. The mist that hits the rounded wall bounces back onto the roots which helps ensure that all sides of the root receive nutrient mist. The indents 20 further form concave recesses on the outer surface of the growing panels 14. The indents 20 may be formed on the risers 19 just above each of the plant plug holes 18 on the outer surface. The indents 20 add to the structural strength of the growing panels 14.

In certain embodiments, each riser 19 of the terrace level 16 is recessed at its base of the terrace level 16 and angled away from a central vertical axis of the terrace structure 12. The angle between the riser 19 and the terrace level 16 may be from about 45 degrees up to about 80 degrees, such as about 60 degrees. The angle of the risers 19 forces the plant to grow slightly outward from the growing panel 14. Therefore, the vegetation hangs freely over the edge of each terrace level 16 for ease of harvesting.

The terrace structure 12 of the present invention may further include end panels 22. The end panels 22 may include a first end panel 22 and a second end panel 22 extending from the bottom portion 11 on opposing sides. The end panels 22 each adjoin the first growing panel 14 and the second growing panel 14 together to further strengthen the terrace structure 12. The internal chamber is formed in between the end panels 22, the bottom portion 11, and the growing panels 14. The end panels 22 structurally hold the growing panels 14 together and contain the mist inside of the terrace structure 12, preventing $CO_2$ and light from entering the enclosed space.

As mentioned above, the mister system 35 is disposed within the enclosed space and directs mist towards the roots of the plant. The mister system 35 projects a mist of water molecules (droplets) that are propelled through the air absorbing fresh oxygen on their way to the roots thus delivering an enriched oxygen nutrient spray to the bare roots, better known as aeroponic misting. In certain embodiments, the mister system 35 includes a plurality of mister heads 34 each having a plurality of nozzles 36. The nozzles 36 may provide a precise micron water droplet size that interacts with the fresh air and creates an enriched oxygen nutrient that irrigates the hanging bare roots. Each mister head 34 may include up to five or more nozzles 36. The nozzles 36 of each mister head 34 may point in a different direction and thereby deliver a mist to a different area of the roots in the enclosed space. The mister heads 34 are designed to distribute a total coverage of the root mass area even if one or even two nozzles 36 were to clog.

Figure 10:
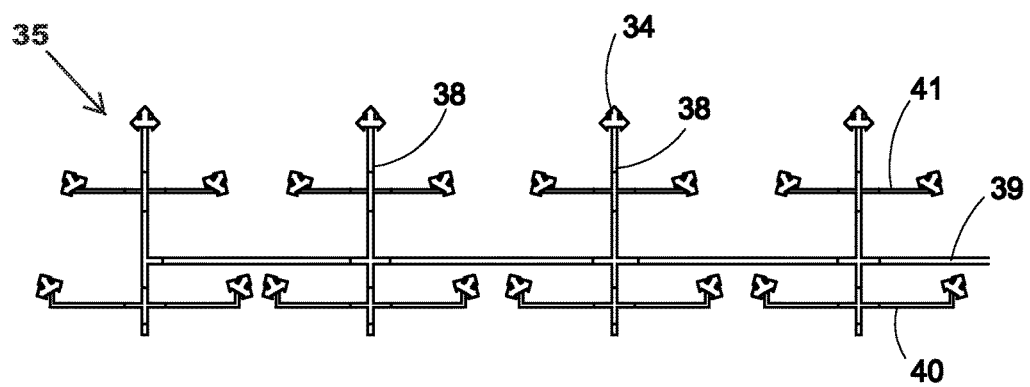
FIG. 10 is a side view of a mister system of an embodiment of the present invention.
Figure 11:
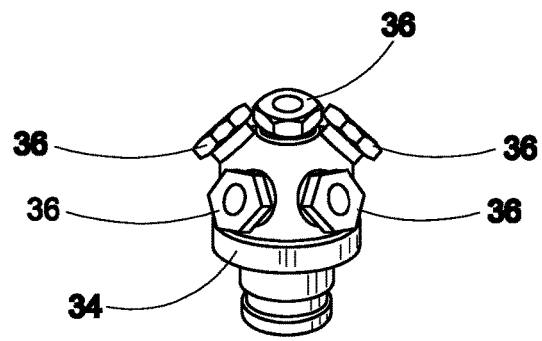
FIG. 11 is perspective view of a mister head of a mister system of an embodiment of the present invention.

The mister system 35 may further include a plurality of pipe trees 38. Each pipe tree 38 may protrude vertically from the bottom portion 11 and may be disposed along the height of the inner surface of the growth panels 14. A plurality of mister heads 34 are secured to the pipe tree 38 and are positioned along different heights of the pipe tree 38. As illustrated in FIG. 10, four pipe trees 38 may be included within each terrace structure 12. Each pipe tree 38 may include horizontal pipes 40, 41. A lower horizontal pipe 40 and an upper horizontal pipes 41 may be secured to the pipe tree 38 to form branches of the pipe tree 38. The lower horizontal pipes 40 may have a greater length than the upper horizontal pipes 41. A mister head 34 may be secured to each end of the lower and upper horizontal pipes 40, 41. A mister head 34 may also be secured to a top end of the vertical pipe tree 38. The pipe tree configuration allows the mister heads 34 and the mister nozzles 36 to provide a mist to all of the roots within the enclosed space. Each of the pipe trees 38 are connected together by a common main water line 39 which pumps nutrient water to the cluster heads 34. The nozzles 36 then propel a nutrient mist though the air to allow the water droplets to absorb fresh oxygen to produce a nutrient rich fertilizer to irrigate the roots.

The pipe tree 38 of the present invention may be made of either stainless steel, copper, galvanized pipe, flexible hose tubing or rigid PVC (poly vinyl chloride) as long as it is water potable.

Figure 12:
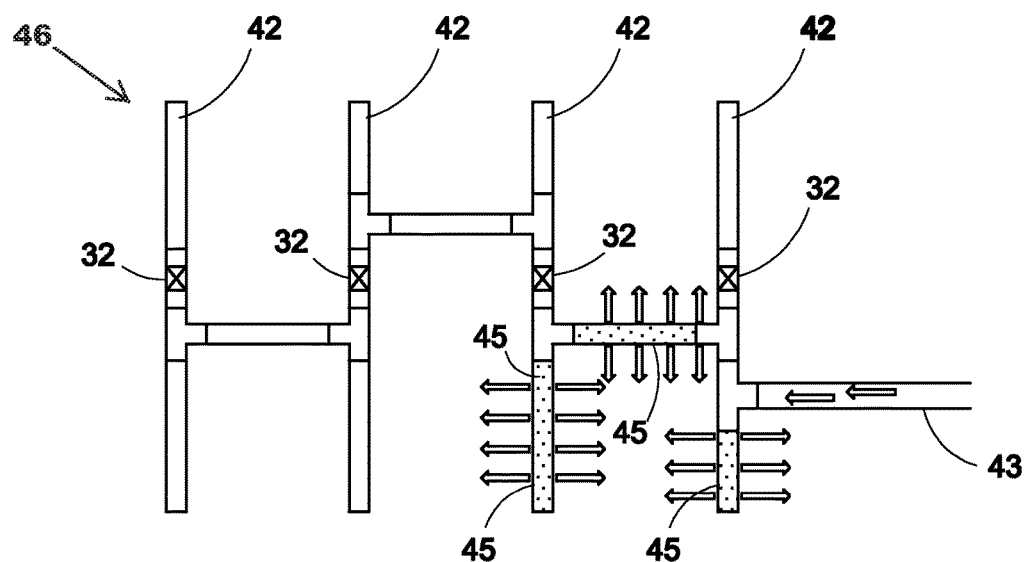
FIG. 12 is a top view of an air exchange delivery system of an embodiment of the present invention.
Figure 13:
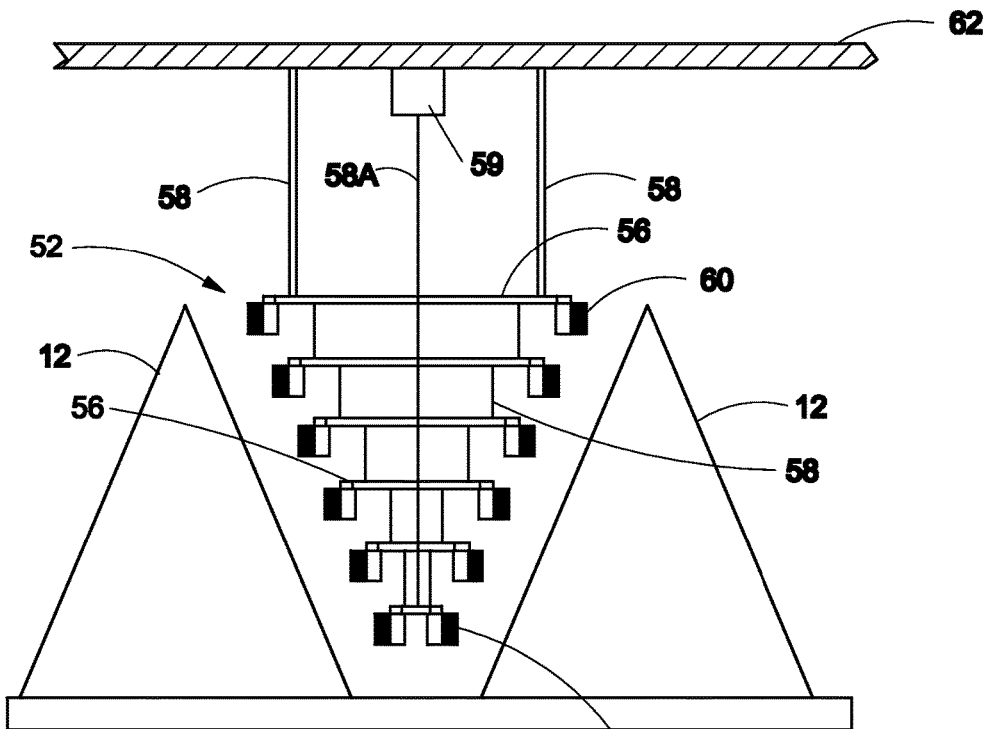
FIG. 13 is an end view of a lighting system of an embodiment of the present invention in a lowered position.
Figure 14:
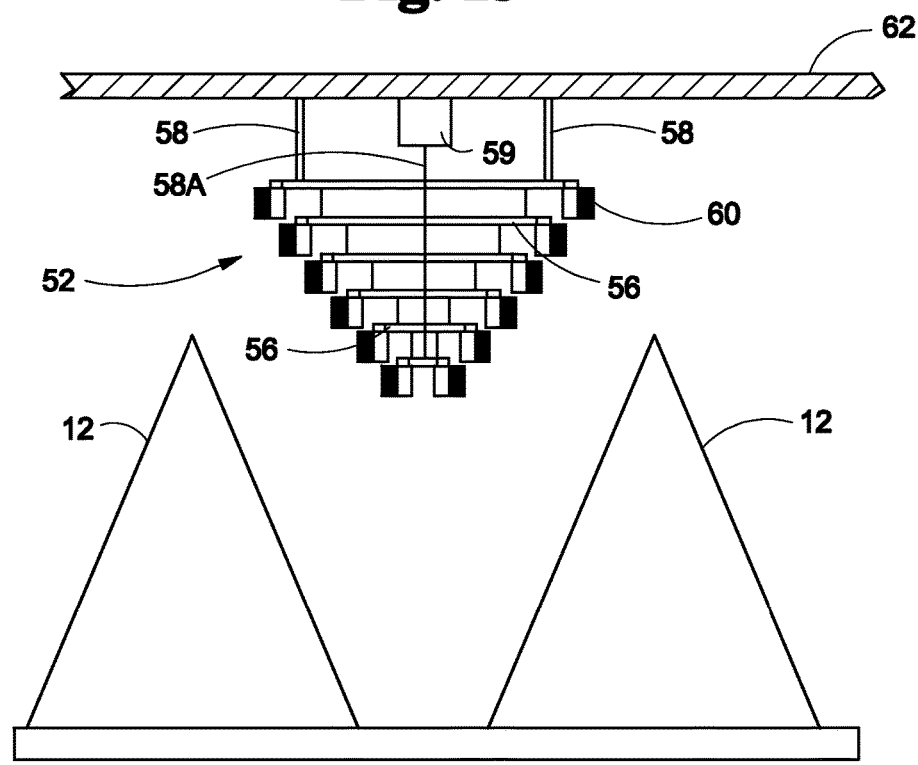
FIG. 14 is an end view of a lighting system of an embodiment of the present invention in a raised position.

The present invention may further include an air exchange delivery system 46 disposed within the enclosed space of the terrace structure 12. The air exchange delivery system 46 may include a network of pipes 42. The network of pipes 42 of the present invention may be made of any rigid non-corrosive material that is hollow such as PVC piping. As illustrated in FIG. 12, the network of pipes 42 may include four receiving ports 32 to receive and vertically support the pipe trees 38. The receiving ports 32 may receive closed ends of the pipe trees 38, thereby preventing any of the nutrient fertilizer from escaping the pipe tree 38 other than through the mister. The network of pipes 42 further includes an entrance 43 and a plurality of sections with apertures 45 formed there though. The entrance 43 may accept a source of fresh air having oxygen and the plurality of apertures 45 may deliver the fresh air within the enclosed space of the terrace structure 12. The fresh cool air may rise and attach to the water droplets of the mist which then attaches to and is absorbed by the roots of the plant.

The present invention may further include an exhaust chimney 28. In certain embodiments, the present invention may include two exhaust chimneys 28. The exhaust chimney 28 allows for the warm older stale air to escape when new cooler fresh air is injected into the enclosed space through the apertures 45 forcing the warmer stale air out of the terrace structure 12. The chimney 28 may further include a damper 65 or cover that closes when the fresh air exchange delivery system 46 stops injecting air into the root growing area. This would ensure that no CO2 would enter the enclosed space when the air exchange delivery system 46 is turned off.

In certain embodiments, the bottom portion 11 of the terrace structure 12 may include outer cross beams 17, inner cross beams 17A, and a catch pan 24 with a drain 26. The cross beams 17, 17A of the present invention may structurally support the terrace structure 12 and suspend the catch pan 24 and the drain 26 in an elevated position. The catch pan 24 includes an inner surface within the enclosed space. The inner surface tapers towards the drain 26 forming a funnel. The catch pan 24 is placed under the growing panels 14 and end panels 22 to recover the excess nutrient mist to be recycled back to a closed loop irrigation system.

The catch pans 24 of the present invention may be made of a polymer such as, but not limited to, thermoform, prime Acrylonitrile-Butadiene-Styrene (ABS), high molecular weight polyethylene, Amorphous thermoplastic material, and the like.

In certain embodiments, the enclosed space may include temperature and humidity sensors to monitor the root growing area's environment. Further, the terrace structure 12 may include a vapor seal to completely make the enclosed space an air tight seal between the growing panels 14, the end panels 22 and the catch pan 24 to improve the pressurizing of the inside of the terrace structure 12. This design ensures that the flow of fresh cool oxygen rich air travels upwards pushing all the old stale warmer air up and out of the enclosed space thus allowing new fresh air to reach all the plants inside the enclosed space of the terrace structure 12.

The present invention may further include a multilevel racking structure 15. The multilevel racking structure 15 provides a resting place for the terrace structures 12 on one, two, three or more levels depending on a warehouse 62 ceiling height. The plurality levels are disposed vertically relative to one another. Each level may support a terrace structure 12 such that the terrace supports 12 are disposed below and above one another. The multilevel racking structure 15 allows a grower to efficiently stack the terrace structures 12, allowing a maximized amount of plants to be grown in a warehouse 62. Further, the multilevel racking structure 15 restrains the terrace structures 12 from moving laterally, suspends the catch pan 24, and provides walkways 64 between the terrace supports 12 to access the vegetation grown on the growing panels 14 without the use of stairs, ladders or mechanical lifts.

The multilevel racking structure 15 may include a plurality of towers each including four posts 50, two short cross beams 10, two double long cross beams 17, 17A, and a number of cross braces 48. The cross braces 48 provide additional support to the structure and the cross beams 10 provide support for the plumbing pipes and the air exchange delivery system 46. In certain embodiments, the plurality towers may be lined up side by side and in front and behind one another within the warehouse 62. Therefore, a width of the warehouse 62, a length of the warehouse 62 and a height of the warehouse 62 may be filled with a plurality of towers, each vertically supporting a plurality of terrace structures 12. The terrace structures 12 may be aligned along the width and the length of the warehouse 62. The walkways 64 may be disposed in between the towers, near the cross beam 17 of each of the terrace structures 12. At each end of the walkways 64 there may be safety bars 47 to ensure that no one falls off the racking structure 15. The walkways 64 or the ceiling beam of the building 62 provides a support for the safety cables 58 to hang the lighting system 52.

The lighting system 52 of the present invention is disposed in the walkway space between the terrace supports 12, emitting light onto the growing panels 14. For example, the lighting system 52 may hang from safety cables 58 in between each of the racking structure support posts 50. A plurality of support bars 56 hang from the safety cables 58 at equal distances relative to one another. The support bars 56 may be substantially horizontally positioned relative to the walkways 64. The support bars 56 may be made of a metal rod, metal tubing, plastic piping, and the like. The safety cables 58 may be made of steel cable, copper wire, nylon rope, cloth rope or the like. The support bars 56 may have different lengths, the longest support bar 56 being at the top and the shortest support bar 56 being at the bottom. The lights 60 are attached to each end of the support bars 56. The lights 60 of the present invention may include, but are not limited to, incandescent lights, fluorescent lights, light emitting diodes (LEDs) and the like. The lighting system 52 may be positioned so that the lights 60 are positioned parallel the growing panels 14 and spaced vertically to be equidistant from the top to the bottom of the plant canopy growing panels 14 to provide an even light pattern over the whole terrace structure 12.

In certain embodiments, the lighting system 52 may be retractable. A hoist 59 raises the lighting system 52 by retracting a hoist cable 58A. The lights may thereby rise to allow pickers and planters to walk down the walkways 64 to access planting and harvest crops. When access is no longer required, the hoist 59 lowers the bars 56 by releasing the hoist cable 58A to their pre-designated location and the lights 60 resume illumination of the plant canopy. In such embodiments, the hoist 59 may be secured to the undercarriage of the walkways 64 or a ceiling of the warehouse 62.

It should be understood, of course, that the foregoing relates to exemplary embodiments of the invention and that modifications may be made without departing from the spirit and scope of the invention as set forth in the following claims.

What is claimed is:

1. An aeroponic system for growing vegetation comprising:
    at least one terrace structure comprising:
        a bottom portion configured to support the terrace structure in an upright position;
        at least one growing panel extending from the bottom portion at an angle relative to the bottom portion and comprising an outer surface and an inner surface, wherein the outer surface comprises a plurality of adjoining risers and terrace levels, wherein
        a plurality of openings are formed through the terrace levels,
        a plurality of convex protrusions are disposed along each of the terrace levels on the inner surface in between the plurality of openings,
        the plurality of convex protrusions forms a plurality of concave recesses on the outer surface, wherein the plurality of concave recesses are formed where the plurality of risers and the plurality of terraces meet, and are disposed above each of the plurality of openings, and
        a substantially enclosed space is formed within the terrace structure in between the bottom portion and the at least one growing panel;
    a lighting system comprising a plurality of lights positioned to emit light towards the outer surface of the at least one growing panel;
    a network of pipes comprising an entrance and a plurality of sections, wherein the entrance is configured to receive fresh air and the plurality of sections are disposed within the enclosed space and comprise apertures configured to deliver the fresh air within the enclosed space;
    at least one pipe tree connected to a water line separate from the entrance of the network of pipes, wherein the at least one pipe tree is disposed within the substantially enclosed space and vertically extends above the network of pipes, wherein the at least one pipe tree comprises a plurality of nozzles configured to deliver mist within the substantially enclosed space.

2. The system of claim 1, wherein the at least one terrace structure comprises a first growing panel and a second growing panel extending from opposing sides of the bottom portion and angled towards one another, forming a triangle shaped structure.

3. The system of claim 2, wherein the at least one terrace structure comprises a first end panel and a second end panel extending from the bottom portion on opposing sides and adjoining the first growing panel and the second growing panel together.

4. The system of claim 1, wherein the bottom portion comprises a catch pan comprising a drain, wherein the catch pan tapers towards the drain forming a funnel.

5. The system of claim 4, wherein the at least one terrace structure comprises an exhaust, wherein the exhaust is a chimney extending from a top end of the terrace structure.

6. The system of claim 1, further comprising a plurality of mister heads secured to the pipe tree, wherein the plurality of mister heads are positioned along different heights of the pipe tree.

7. The system of claim 6, wherein each of the plurality of mister heads comprises the plurality of nozzles each facing a different direction.

8. The system of claim 1, further comprising a multilevel racking structure comprising a plurality of cross beams disposed vertically relative to each other, wherein each cross beam supports at least one terrace structure.

9. The system of claim 8, further comprising a plurality of multilevel racking structures disposed adjacent to one another and comprising a plurality of walkways formed therebetween.

10. The system of claim 1, wherein the lighting system hangs from an undercarriage of a walkway or a ceiling above the at least one terrace structure.

11. The system of claim 10, wherein the lighting system comprises a hoist operable to lower and raise the lighting system.

12. The system of claim 11, wherein the lighting system comprises a plurality of horizontal support bars each comprising a first end and a second end, wherein a light is secured to each of the first end and the second end.

13. The system of claim 12, wherein the plurality of horizontal support bars are secured together by cables, wherein the cables are secured to the hoist.

14. The system of claim 13, wherein the plurality of horizontal support bars each comprise different lengths, wherein the plurality of horizontal support bars increases in length from a bottom support bar to a top support bar.

15. An aeroponic system for growing vegetation comprising:
    at least one terrace structure comprising:
        a bottom portion configured to support the terrace structure in an upright position; and
        at least one growing panel extending from the bottom portion at an angle relative to the bottom portion and comprising an outer surface and an inner surface, wherein the outer surface comprises a plurality of adjoining risers and terrace levels, wherein
        a plurality of openings are formed through the terrace levels,
        a plurality of convex protrusions are disposed along each of the terrace levels on the inner surface in between the plurality of openings,
        the plurality of convex protrusions forms a plurality of concave recesses on the outer surface, wherein the plurality of concave recesses are formed where the plurality of risers and the plurality of terraces meet, and are disposed above each of the plurality of openings, and
        a substantially enclosed space is formed within the terrace structure in between the bottom portion and the at least one growing panel;
    a lighting system comprising a plurality of lights positioned to emit light towards the outer surface of the at least one growing panel; and
    a mister system disposed within the substantially enclosed space.

* * * * *